United States Patent [19]

Bartholomew

[11] Patent Number: 5,052,723
[45] Date of Patent: Oct. 1, 1991

[54] LOCKING ACCOMMODATING SEALING PORT

[75] Inventor: Donald D. Bartholomew, Mt. Clemens, Mich.

[73] Assignee: Proprietary Technology, Inc., Southfield, Mich.

[21] Appl. No.: 405,758

[22] Filed: Sep. 11, 1989

[51] Int. Cl.⁵ ............................................. F16L 17/00
[52] U.S. Cl. .................................... 285/108; 285/111; 285/308; 285/319
[58] Field of Search .............. 285/319, 308, 340, 379, 285/92, 108, 111

[56] References Cited

U.S. PATENT DOCUMENTS

| | | | |
|---|---|---|---|
| 3,874,709 | 4/1975 | MacDonald | 285/340 X |
| 4,146,254 | 3/1979 | Turner et al. | 285/340 X |
| 4,181,329 | 1/1980 | Helm | 285/340 X |
| 4,747,626 | 5/1988 | Hama et al. | 285/308 |
| 4,749,214 | 6/1988 | Hoskins et al. | 285/379 X |

FOREIGN PATENT DOCUMENTS 2182743 5/1987 United Kingdom ............... 285/379

Primary Examiner—Dave W. Arola
Attorney, Agent, or Firm—Harness, Dickey & Pierce

[57] ABSTRACT

A port is described which will lock on to a standard hose and clamp nipple end, and accommodate more axial mis-match between the axis of the port and nipple than is normally experienced in the fabrication of piping to join between two devices. A releasing member which will release the male from the port can also be included. When two ports are used in a sleeve-like device 20 in FIG. 1, and releasers 18 in FIG. 1, pipe 12 can be joined to nipple 14 as shown. Sleeve 20 can be slipped (and shipped) completely on to pipe 12, allowing installation of pipe 12 by simply positioning pipe 12 in the installed position, and sliding sleeve 20 over nipple 14. Removal requires operating releaser 18 and moving sleeve 20 back onto pipe 12. The system easily replaces existing hose and clamp installations, but is repairable in the field with a hose and clamps.

6 Claims, 1 Drawing Sheet

LOCKING ACCOMMODATING SEALING PORT

BACKGROUND AND SUMMARY OF INVENTION

There are a large number of piping systems that use reinforced rubber hose to join the ends of pipes, or pipes to short nipples, that are affixed to some device which must be connected to the piping system. Rubber hose and hose clamps used to secure the hose on the piping system have been in use for many years.

In situations where two devices are to be "connected", and there is a relative movement between the devices, use of a flexible hose to join the two devices makes very good sense.

However, there is another situation where the two devices do not move relative to each other, but hose, clamps and sometimes pipe lengths are used to join those devices This "makes sense" because of the difficulty of making any pipe that routes between two devices, that is "perfect" enough to meet the connection requirements at the joining points.

Disclosed herein is an "accommodating sealing sleeve" that will replace the hose and clamps because it will lock on to a standard hose nipple end, and it provides a seal and accommodation of the variations in the joining pipe that caused the hose and clamps to be used.

This accommodating sealing sleeve also conveys some important advantages to the manufacturer of engines or equipment that would use accommodating sleeves. Due to the clutter of other things around the point where the hose clamps are to be tightened or removed, there is often very little room to tighten the clamps. Difficult to reach areas like this are the cause of many problems of wrong clamp location, or improper torquing of the clamp, and are thus the source of a lot of the manufacturing and later service costs.

There is also the time required to "make" a proper joint. When an accommodating sealing sleeve is shipped on the pipe to be installed, so that both ports are slid back up on the pipe, it is only necessary to position the pipe and slide the sleeve off of the pipe and onto the mating hose nipple until the barb at the end of the pipe stops the movement. This, of course, is much faster than even installing the length of hose, so placing the clamps on the hose, keeping them roughly positioned while installing the hose, positioning the clamps, and then properly torquing them is saved too.

What is immediately evident is that the accommodating sealing sleeve can cost the user more than the purchase price of the hose and the clamps, and still save a significant amount of money. The user also gains a very real improvement in reliability for his customer.

The user has also, by using the accommodating sealing sleeves, given his customer the option, if a replacement is necessary, to use a new sleeve or use the older hose and clamps. This means that if the customer could have "repaired" the old way, he can also "repair" the new way even if he does not have a replacement sleeve. This removes the problem of having to immediately have the repair parts in the "field".

The accommodating sealing sleeve may also be supplied with a "releaser", an element captured in each end port that is tubular, and when pushed inward, will release the locking from the bead at the end of the nipple or pipe. By using "releasers" the sleeves can be made so that they are easy to decouple as well.

The figures show an embodiment of the "port" that has features of the locking system which lend themselves to low tooling costs for a large variety of sizes, and a means of obtaining a very large (relative to industry practice) accommodation of coaxial mis-match, and angular mis-match of the pipe and nipple ends.

The objectives of this disclosure are to :
1. Provide a reliable sealing port.
2. Provide a reliable sealing port which will accommodate variations in the angular and coaxial and proper length match of the end or ends being joined.
3. Provide a port which locks a pipe end into the port.
4. Provide a port that includes a releasing element.
5. Provide an accommodating, sealing, locking, releasable sleeve-like device which will replace a length of hose and hose clamps.
6. Provide a connection that is readily field reparable.

BRIEF DESCRIPTION OF THE DRAWINGS

Consideration of the following figures will assist in understanding how the objectives are met.

DETAILED DESCRIPTION OF THE INVENTION

Figure 1:
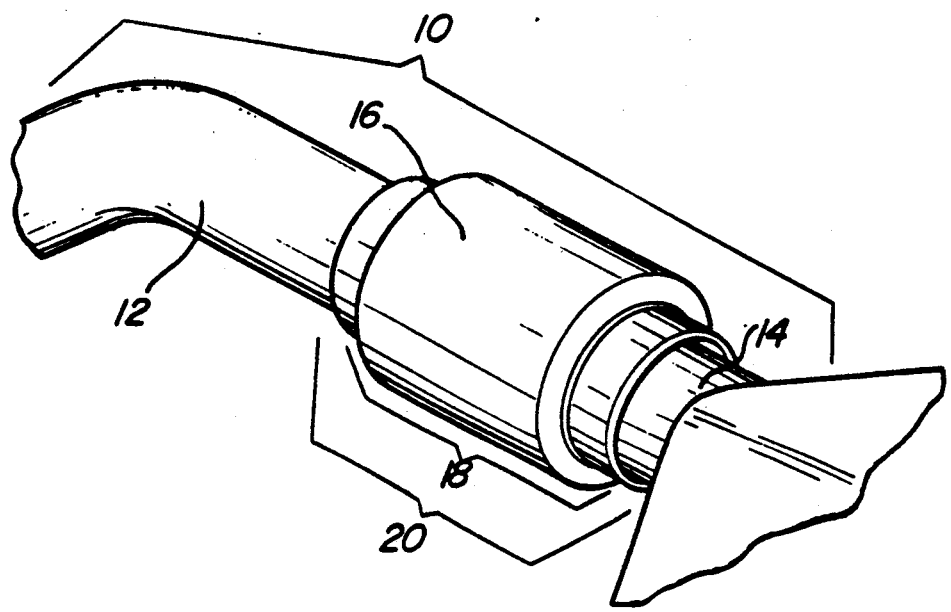
FIG. 1 shows a piping system connection utilizing an accommodating sealing sleeve that is terminated with a locking, accommodating, sealing part at each end of the sleeve.

Referring to FIG. 1, a portion of a piping system 12 is shown connected to a device hose and clamp nipple 14 with an accommodating sealing sleeve assembly 20. The combination 10 also shows the outer housing 16 of the sleeve assembly 20 and releasers for each port 18.

Figure 2:
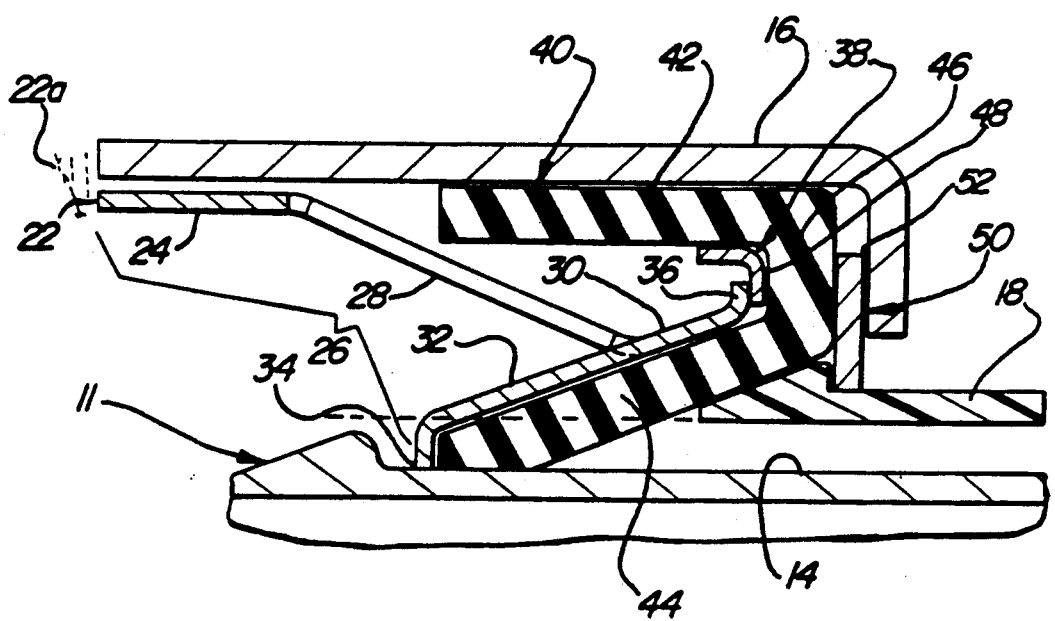
FIG. 2 shows a partial cross section of one of the sleeve ports.

The nipple 14 and pipe 12 are both terminated with a hose fitting end barb or bead representation shown in FIG. 2 by numeral 11. Means, (shown in FIG. 2) within housing 16 act as spring locking fingers which open up as the sleeve 20 is pushed over and onto pipe 12 or nipple 14, and snap in behind this end bead or barb 11 when moved onward beyond the larger diameter of the beaded or barbed portion of the pipe 12 or nipple 14 end.

The sleeve 20 is initially positioned entirely on pipe 2, and pipe 12 is then positioned in the location it would occupy if sleeve 20 were installed. Then sleeve 20 is moved on to nipple 4 until the internal spring finger locking means described prevents further onward movement of sleeve 20 onto nipple 14 as the fingers in the pipe 12 port end engage the barb or bead 11 provided on the end of pipe 12. If the distance between the ends of pipe 12 and nipple 14 are within the gap tolerance, which can be as great as desired (it only affects the length of housing 16) then the locking fingers of the port on the nipple 14 end of sleeve 20 will have also passed over the end bead or barb 11 of the nipple 14.

The sleeve 20 is now locked onto both the pipe 12 and the nipple 14.

To remove pipe 12 from nipple 14, the releaser 18 on the nipple port of sleeve 20 is urged inward. This causes opening of the locking fingers, unlocking these fingers from the bead or barb 11 provided on the end of nipple 14, and the sleeve 20 is moved to a position that is completely on pipe 12. Pipe 12 is now free and can be removed.

FIG. 2 shows a cross section of one of the ports of sleeve 20 or a single port of some other device. The housing 16 is shown ending at the end 22 of retaining member 26. Member 26 is prevented from inward movement by a stop 22a provided within housing 16, or by abutment with the retaining means used in the port at the opposite end of housing 16. The space between end 22 and the end 34 of spring finger 32, accommodates the length of the beaded or barbed end 11 of nipple 14 (or pipe 12) plus some gap between the end of the mating pipe 12, or the bottom of some port female housing that would stop the inward movement of a pipe or nipple that was being mated to the port. Additional gap could be provided by increasing the axial space between ends 22 and 34, or by providing a stop 22a for end 22 within housing 16 and enlarging the space in that manner.

Retaining member 26 is made from thin metal, such as 0.025 thick stainless steel strip, so that portion 24 provides a width from which spring portions 28 depend. At the end of spring portions 28 a wider portion 30 joins springing fingers 32. The ends of 32 and 30 may be shaped to provide a suitable abutting area as shown in the figure. It is noted that springing finger portions 32 may be wider and stiffer than spring portions 28, and if desired stiffened by many means including channel shaping, addition of a stiffening rib, or by addition of a stiff part which is held in position by fingers 32. In the preferred embodiment, a number of spring arms 28 and fingers 32 would be used. Portion 24 would be then appropriately bent so that retaining member 26 approximates a circle with a small segment of its outer arc missing, so that it may be installed in the interior of housing 16. Spring portions 28, and fingers 32 may also be used as a means of urging sealing means 40, arms 42 and 44, into engagement with the interior of housing 16 and nipple end 14 to assist in sealing at low confined pressure. End 34 of finger 32 abuts the barb or bead 11 formed on the end of pipe 12 or nipple 14, so as to transfer pull apart forces between sleeve 20 and pipe 12 or nipple 14, to portion 36 which abuts ring 38 as shown. Ring 38 transfers these forces to seal 40, which transfers these forces to back up ring 50, which transfers the pull apart forces to the abutting member 52 which is a part of, or affixed to housing 16. The forces transmitted by fingers 32 are not parallel to the axis of the sleeve, as is seen in the figure, so ring 38 must be capable of passing on both axial and radial forces to seal 40. It is also noted that in some cases it would be adequate to not use ring 38, and instead form end 36 so that it would pass on both axial and radial forces. Ring 38 has the advantage of distributing the pull apart forces to a larger portion of seal 40.

Backup ring 50 is made so as to be interposed between 40 and housing 16 abutting portion 52 in a way that allows accommodation of non-coaxial conditions between sleeve 20 and pipe 12 or nipple 14, while still backing up seal 40 in areas of seal 40 that have the least resistance to extrusion or deformation caused by confined pressure.

Releaser 18 is captured by ring 50, and when urged toward end 34 of the spring fingers 32, operates through seal 40 to remove engagement of fingers 32 and seal 40 from the bead or barb 11 on the end of pipe 12 or nipple 14.

Suitable materials for seal 40 and releaser 18 would be an appropriate elastomer for seal 40, which is resistant to the media confined by system 10 and a stiff hard plastic material, such as a glass filled polyester, for releaser 18. The barbed end of releaser 18 also acts to contact the exterior of seal 40 to limit the deformation under pressure of seal 40 in a manner similar to that described for ring 50.

As can be seen from the figures, a port made in accordance with this disclosure has the ability to accommodate off-port-axis positioning of the mating hose nippleend that is plugged into the port. This off-port-axis positioning can be in axial angle, as well as axis off-set.

Accommodation of these axis conditions is the major reason that hoses and clamps have been used to join pipes and nipples for so many years. The advantages of very rapid and reliable attachment, using the accommodating sealing sleeve that is capable of accommodating the usual fabrication tolerances, will immediately be recognized by those responsible for using the present methods of attachment. Those who use the present hose and clamp method of making these type connections are also very concerned with the field repairability of these connections should they ever be damaged or fail. As is noted in the disclosure objectives, field repairability is an important consideration. Other connector port connector concepts have been patented by the author, and at the time of filing hundreds of millions of connectors of that basic concept type of connector family are in current use. One of the major differences between the two concepts lies in the type of male end accepted by the connection port. Both concepts share the benefits of abutting a compressively very stiff spring finger against the back of a bead or barb that is formed or affixed to the male pipe end or nipple, but a new male standard end had to be implemented for the earlier family of connections. In this earlier case, the bead or barb was located some distance back from the pipe or nipple end, and the sealing area of the male is located between this abutting area and the end of the male.

Contrawise, the present concept involves finding a way of using standard flexible hose nipple ends that employ a bead, or barb at the end of the nipple (male), and the sealing is accomplished to the rear of that abutting area, rather than in front of the abutting area as in the earlier family of connections. Repair, in the present case, can be accomplished by replacing an accommodating sleeve with hose and clamps.

The present concept uses the very important advance in the state of connection retaining art that is introduced in the previous family, wherein the retaining means is functionally separated into a compressive portion that is interposed between the abutting area of the male and female, and a flexing portion which carries and locates the compressive portion. The difference between the two families or concepts is that the present concept involves passing the male-female separation forces through the sealing means, and the earlier concept passed these forces directly to the female abutting wall. Means are provided in the present concept to pass these forces through a portion of the seal which is not involved in the actual sealing function, and distribute these forces in a manner that reduces the unit stress applied to the material of the seal in the force transfer area. It is noted that although hose clamps have a larger compressive "footprint" in general than would be commonly be used for the disclosed concept, the distortion stresses imposed on the elastomer (seal in the present case) are much lower than those imposed by the hose clamp on a hose, because the hose clamp must also provide the compressive squeeze for sealing, and retaining (which is much less efficiently accomplished when clamping). It is also noted that ring 38 of FIG. 2 can be made with a "u" type cross section instead of the "L" type cross section shown. This would be of advantage if the springing fingers 26 were merely used as holders for a much heavier, stiffer compression member snap in insert that would abut in the "u" section.

The design of the sealing port is such that it is applicable to small or large diameter piping systems, and although it is somewhat larger in diameter than the earlier connector family previously mentioned (about 25% to 30% larger), it has a much greater ability to tolerate tube or nipple end axial mis-matches. And, as a sleeve device with ports at both ends, allows "swing-in" assemblies of tubes to their mating position. For those not intimately familiar with the actual use of connection devices, "swing-in" means movement that is perpendicular to the axis of the device being mated by the pipe being "connected" is all that is necessary. The earlier family of connections, and most others (except for hoses and clamps), also require movement of the pipe being connected that is parallel to the axis of the port of the device being connected.

I claim:

1. A connector sleeve comprising:
   an annular housing;
   sealing means for sealing a conduit with an annular bead in said annular housing, said sealing means positioned in said housing and including an axial opening enabling passage of said conduit through said sealing means and said sealing means including an annular channel;
   retaining means for coupling with the annular bead of said conduit for retaining said conduit in said housing, said retaining means extending into said channel of said sealing means for maintaining said sealing means in said housing and applying a force on said sealing means for sealingly engaging said sealing means with said conduit and said housing; and
   means for maintaining position of said sealing means and retaining means against axial movement in said housing, said maintaining means associated with said housing.

2. The connector sleeve according to claim 11, wherein said retaining means includes a member for maintaining said seal means in position, said member positioned in said channel, and a plurality of fingers springingly positioning against said bead for retaining said conduit in said sleeve.

3. The connector sleeve according to claim 2, wherein said maintaining means includes an accommodating ring and a portion of said housing in abutment therewith, said accommodating ring positioned between said seal means and said abutting portion of said housing, said accommodating ring acting to transfer force from said seal means to said housing to prevent loss of the seal due to unsupported areas of said seal means which occur if the axis of said port is not aligned with the axis of said conduit.

4. The connector sleeve according to claim 1, further comprising a releasing device which, when actuated, acts to disengage said retaining means from said annular bead to enable release of said conduit from said sleeve.

5. The connector device according to claim 4, wherein said releasing device is attached to said sleeve.

6. The connector sleeve according to claim 1, wherein said seal means is U-shaped in cross section, with the inside leg of said "u" sealing over the outside of said conduit, and the outside leg of said "u" seals the inside of said housing.

* * * * *

UNITED STATES PATENT AND TRADEMARK OFFICE
CERTIFICATE OF CORRECTION

PATENT NO. : 5,052,723
DATED : October 1, 1991
INVENTOR(S) : Donald D. Bartholomew It is certified that error appears in the above-identified patent and that said Letters Patent is hereby corrected as shown below:

Column 1, line 19, after "devices", insert --.--

Column 2, line 47, "2" should be --12--

Column 2, line 50, "4" should be --14--

Column 6, line 8, claim 2, "11" should be --1--

Column 6, line 28, claim 5, "device" should be --sleeve--

Signed and Sealed this

Fourteenth Day of June, 1994

Attest:

BRUCE LEHMAN

Attesting Officer    Commissioner of Patents and Trademarks